(12) United States Patent
Suzuki et al.

(10) Patent No.: US 8,466,995 B2
(45) Date of Patent: *Jun. 18, 2013

(54) SOLID-STATE IMAGING DEVICE AND CAMERA SYSTEM

(75) Inventors: Fumitsugu Suzuki, Kanagawa (JP); Yusuke Oike, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/067,828

(22) Filed: Jun. 29, 2011

(65) Prior Publication Data

US 2012/0019697 A1 Jan. 26, 2012

(30) Foreign Application Priority Data

Jul. 26, 2010 (JP) .................................. 2010-167543

(51) Int. Cl.
*H04N 5/335* (2011.01)

(52) U.S. Cl.
USPC ........................................................ 348/308

(58) Field of Classification Search
USPC ....... 348/302, 307, 308, 241, 301; 250/208.1; 377/52, 111, 116; 341/118, 120, 126, 155, 341/164, 122
See application file for complete search history.

(56) References Cited

U.S. PATENT DOCUMENTS

| | | | |
|---|---|---|---|
| 7,626,618 B2 * | 12/2009 | Adachi et al. | 348/248 |
| 8,023,001 B2 * | 9/2011 | Mizuta | 348/222.1 |
| 8,063,960 B2 * | 11/2011 | Sakai et al. | 348/297 |
| 2003/0214597 A1 * | 11/2003 | Nam | 348/308 |
| 2004/0008134 A1 * | 1/2004 | Krymski et al. | 341/155 |
| 2005/0195304 A1 * | 9/2005 | Nitta et al. | 348/308 |
| 2008/0211951 A1 * | 9/2008 | Wakabayashi et al. | 348/308 |
| 2009/0159782 A1 * | 6/2009 | Murakami et al. | 250/208.1 |
| 2011/0019047 A1 * | 1/2011 | Suzuki et al. | 348/302 |

FOREIGN PATENT DOCUMENTS

JP 2005-278135 10/2005

OTHER PUBLICATIONS

W. Yang et al., "An Integrated 800×600 CMOS Imaging System," ISSCC Digest of Technical Papers, Session 17/Paper WA 17.3, pp. 304-305, Feb. 1999.

* cited by examiner

*Primary Examiner* — Tuan Ho
(74) *Attorney, Agent, or Firm* — Rader, Fishman & Grauer PLLC

(57) ABSTRACT

A solid-state imaging device includes: a pixel section in which pixels performing photoelectric conversion are arranged in a matrix shape; and a pixel signal reading section that has an AD conversion section which reads pixel signals through pixel units from the pixel section and performs analog digital (AD) conversion. The pixel signal reading section includes comparators each of which compares a reference signal, which is a ramp wave, with read analog signal potentials of pixels in a corresponding column, counter latches each of which is disposed to correspond to each of the comparators, is able to count a comparison time of the corresponding comparator, stops the count when an output of the corresponding comparator is inverted, and retains a corresponding count value, and an adjustment section that performs offset adjustment on the reference signal for each row on which the AD conversion is performed.

23 Claims, 12 Drawing Sheets

EXEMPLARY CONFIGURATION OF CURRENT CONTROL DAC

FIG.8

(X) ANALOG VALUE (DIGITALLY CONVERTED)

D PHASE

|   | A | B | C |
|---|---|---|---|
| a | 1.2 | 0.8 | 1.9 |
| b | 1.1 | 0.8 | 1.6 |
| c | 1.3 | 0.6 | 1.7 |

P PHASE

|   | A | B | C |
|---|---|---|---|
| a | 0.9 | 0.4 | 1.6 |
| b | 0.7 | 0.5 | 1.5 |
| c | 0.9 | 0.3 | 1.4 |

OFFSET VALUE
+0.1 →
+0.0 →
+0.0 →

+0.3 →
+0.2 →
+0.1 →

D PHASE

|   | A | B | C |
|---|---|---|---|
| a | 1.3 | 0.9 | 2.0 |
| b | 1.1 | 0.8 | 1.6 |
| c | 1.3 | 0.6 | 1.7 |

P PHASE

|   | A | B | C |
|---|---|---|---|
| a | 1.2 | 0.7 | 1.9 |
| b | 0.9 | 0.7 | 1.7 |
| c | 1.0 | 0.4 | 1.5 |

(Y) DIGITAL VALUE (AFTER A/D CONVERSION)

D PHASE

|   | A | B | C |
|---|---|---|---|
| a | 1 | 0 | 1 |
| b | 1 | 0 | 1 |
| c | 1 | 0 | 1 |

P PHASE

|   | A | B | C |
|---|---|---|---|
| a | 0 | 0 | 1 |
| b | 0 | 0 | 1 |
| c | 0 | 0 | 1 |

D PHASE

|   | A | B | C |
|---|---|---|---|
| a | 1 | 0 | 2 |
| b | 1 | 0 | 1 |
| c | 1 | 0 | 1 |

P PHASE

|   | A | B | C |
|---|---|---|---|
| a | 1 | 0 | 1 |
| b | 0 | 0 | 1 |
| c | 1 | 0 | 1 |

(Z) AFTER CDS (D PHASE − P PHASE)

|   | A | B | C |
|---|---|---|---|
| a | 1 | 0 | 0 |
| b | 1 | 0 | 0 |
| c | 1 | 0 | 0 |

|   | A | B | C |
|---|---|---|---|
| a | 0 | 0 | 1 |
| b | 1 | 0 | 0 |
| c | 0 | 0 | 0 |

NO OFFSET
(A)

OFFSET
(B)

APPLICATION OF OFFSET VALUE

FIG.11

(X) ANALOG VALUE (DIGITALLY CONVERTED)

D PHASE

|   | A | B | C |
|---|---|---|---|
| a | 1.2 | 0.8 | 1.9 |
| b | 1.1 | 0.8 | 1.6 |
| c | 1.3 | 0.6 | 1.7 |

P PHASE

|   | A | B | C |
|---|---|---|---|
| a | 0.9 | 0.4 | 1.6 |
| b | 0.7 | 0.5 | 1.5 |
| c | 0.9 | 0.3 | 1.4 |

OFFSET VALUE
+0.2 →
+0.2 →
+0.2 →
+0.2 →
+0.2 →
+0.2 →

D PHASE

|   | A | B | C |
|---|---|---|---|
| a | 1.4 | 1.0 | 2.1 |
| b | 1.3 | 1.0 | 1.8 |
| c | 1.5 | 0.8 | 1.9 |

P PHASE

|   | A | B | C |
|---|---|---|---|
| a | 1.1 | 0.6 | 1.8 |
| b | 0.9 | 0.7 | 1.7 |
| c | 1.1 | 0.5 | 1.6 |

(Y) DIGITAL VALUE (AFTER A/D CONVERSION)

D PHASE

|   | A | B | C |
|---|---|---|---|
| a | 1 | 0 | 1 |
| b | 1 | 0 | 1 |
| c | 1 | 0 | 1 |

P PHASE

|   | A | B | C |
|---|---|---|---|
| a | 0 | 0 | 1 |
| b | 0 | 0 | 1 |
| c | 0 | 0 | 1 |

D PHASE

|   | A | B | C |
|---|---|---|---|
| a | 1 | 1 | 2 |
| b | 1 | 1 | 1 |
| c | 1 | 0 | 1 |

P PHASE

|   | A | B | C |
|---|---|---|---|
| a | 1 | 0 | 1 |
| b | 0 | 0 | 1 |
| c | 1 | 0 | 1 |

(Z) AFTER CDS (D PHASE − P PHASE)

|   | A | B | C |
|---|---|---|---|
| a | 1 | 0 | 0 |
| b | 1 | 0 | 0 |
| c | 1 | 0 | 0 |

|   | A | B | C |
|---|---|---|---|
| a | 0 | 1 | 1 |
| b | 1 | 1 | 0 |
| c | 0 | 0 | 0 |

NO OFFSET (A)   OFFSET (B)

SOLID-STATE IMAGING DEVICE AND CAMERA SYSTEM

FIELD

The present disclosure relates to a solid-state imaging device typified by a CMOS image sensor and a camera system.

BACKGROUND

CMOS image sensors can be manufactured by using the same manufacturing process as for typical CMOS integrated circuits, and can be driven by a single power source. Hence, by using the CMOS process, it is possible to provide analog circuits and logic circuits together in the same chip.

Hence, there is a plurality of strong merits such as reduction in the number of peripheral ICs.

The output circuit of a CCD in mainstream use is a single channel (ch) output type which uses a FD amplifier having a floating diffusion (FD) layer.

In contrast, since the CMOS image sensor has the FD amplifier for each pixel, the output circuit thereof in mainstream use is a column-parallel output type in which a single row in the pixel array is selected and the entire row is simultaneously read in the column direction.

It is difficult for the FD amplifier, which is disposed in each pixel, to exhibit a sufficient driving capability, and thus it is necessary to lower the data rate. This is a reason why the parallel processing is advantageous.

There are proposed various pixel signal reading (output) circuits of column-parallel output type CMOS image sensors.

The most advanced one thereof is a pixel signal reading circuit which has an analog-digital converter (hereinafter abbreviated as an ADC) for each column so as to extract pixel signals as digital signals.

Such a CMOS image sensor equipped with column-parallel ADCs is disclosed in, for example, JP-A-2005-278135 or non-patent document "Integrated 800×600 CMOS Image System" (W. Yang et al., ISSCC Digest of Technical Papers, pp. 304-305, February, 1999).

FIG. 1 is a block diagram illustrating an exemplary configuration of a solid-state imaging device (a CMOS image sensor) equipped with column-parallel ADCs.

A solid-state imaging device 1 includes a pixel section 2, a vertical scanning circuit 3, a horizontal transfer scanning circuit 4, and a column processing circuit group 5 formed by an ADC group as shown in FIG. 1.

The solid-state imaging device 1 further includes a digital-analog converter (hereinafter, abbreviated as DAC) 6 and amplifier circuits (S/A) 7.

The pixel section 2 is configured such that, for example, the unit pixels 21, each of which includes a photodiode (a photoelectric conversion device) and an in-pixel amplifier, are arranged in a matrix shape (a shape of rows and columns).

In the column processing circuit group 5, a plurality of columns of column processing circuits 51, each of which forms the ADC in each column, are arranged.

Each column processing circuit (ADC) 51 includes a comparator 51-1 that compares a reference signal RAMP (Vslop), which has a RAMP waveform obtained when the reference signal generated by the DAC 6 is changed in a stepwise manner, with an analog signal Vsl which is obtained from pixels of each row line through a vertical signal line 8.

Each column processing circuit (ADC) 51 further includes a counter latch (memory) 51-2 which counts the comparison time of the comparator 51-1 and retains the count result.

The column processing circuit 51 has an n-bit digital signal conversion function, and is disposed for each of the vertical signal lines (column lines) 8-1 to 8-n, thereby constituting a column-parallel ADC block.

Outputs of respective counter latches (memories) 51-2 are connected to horizontal transfer lines 9 having, for example, a k-bit width.

In addition, there are disposed k amplifier circuits 7 corresponding to the horizontal transfer lines 9.

FIG. 2 is a diagram illustrating a timing chart of the circuit of FIG. 1.

In each column processing circuit (ADC) 51, the comparator 51-1, which is disposed for each column, compares an analog signal (electric potential Vsl), which is read to the vertical signal line 8, with the reference signal RAMP (Vslop) which changes in a stepwise manner.

At this time, until levels of the analog potential Vsl and the reference signal RAMP (Vslop) intersect each other and an output of the comparator 51-1 is inverted, the counter latch 51-2 performs the count, and then the electric potential (the analog signal) Vsl of the vertical signal line 8 is converted into a digital signal (AD converted).

The AD conversion is performed twice through one reading.

In the first conversion, reset levels (P phase) of the unit pixels 21 are read to the vertical signal lines 8 (8-1 to 8-n) and AD conversion is performed.

The P phase of the reset levels includes variations between pixels.

In the second conversion, signals, which are photoelectrically converted by respective unit pixels 21, are read to the vertical signal lines 8 (8-1 to 8-n) (D phase), and AD conversion is performed.

The D phase also includes variations between pixels, and thus the calculation of (D-phase level−P-phase level) is executed, thereby realizing correlated double sampling (CDS).

Signals converted into digital signals are recorded in the counter latches 51-2, sequentially read to the amplifier circuit 7 through the horizontal transfer lines 9 by the horizontal (column) transfer scanning circuit 4, and finally output.

In such a manner, the column-parallel output processing is performed.

In addition, the count processing of the counter latch 51-2 at the P phase is referred to as primary sampling, and the count processing of the counter latch 51-2 at the D phase is referred to as secondary sampling.

SUMMARY

The above-mentioned CDS is performed, even when the effects of the dark current and the characteristics of the photodiode (PD) are neglected, in order for variation in threshold values of the reading amplifier transistors to cancel variation in signal potentials Vsl which are read to the vertical signal lines 8.

In the CDS, the difference between the reset level and the signal level (reset level+net signal level) is taken, and thus ideally if the net signal is 0, the difference is 0.

Here, even when there is no incident light, in some cases, the difference may not be 0.

For such cases, a plurality of reasons can be considered. One of the reasons is that, in accordance with not only the effect of noise but also the effects of the reset characteristics of the ramp wave and the reset characteristics of the comparator, the offset value is added to either of the primary sampling value and the secondary sampling value.

Even when the offset value is added between the samplings, there may be no difference in the way of rounding in the AD conversion. In this case, there is no effect on image quality.

However, in a case where there is a difference in the way of rounding, that is, in a case where a quantization error occurs, it is difficult for the CDS to cancel the variation.

Further, since one comparator is provided for each column, there is high correlation in each column, and under certain conditions, there are columns in which the quantization error is more likely to occur and columns in which the quantization error is less likely to occur.

For this reason, in a case where the resolution power is high, the range in which the discrete values are obtainable increases. In contrast, in a case where the resolution power is low, fixed vertical streaks appear in an image.

Thus, it is desirable to provide a solid-state imaging device and a camera system capable of suppressing occurrence of quantization vertical streaks caused by the quantization error at the time of the AD conversion, thereby improving image quality.

A solid-state imaging device of an embodiment of the present disclosure includes: a pixel section in which a plurality of pixels performing photoelectric conversion are arranged in a matrix shape; and a pixel signal reading section that has an AD conversion section which reads pixel signals through a plurality of pixel units from the pixel section and performs analog digital (AD) conversion. The pixel signal reading section includes: a plurality of comparators each of which compares a reference signal, which is a ramp wave, with read analog signal potentials of pixels in a corresponding column; a plurality of counter latches each of which is disposed to correspond to each of the plurality of comparators, is able to count a comparison time of the corresponding comparator, stops the count when an output of the corresponding comparator is inverted, and retains a corresponding count value; and an adjustment section that performs offset adjustment on the reference signal for each row on which the AD conversion is performed.

A camera system according to another embodiment of the present disclosure includes: a solid-state imaging device; and an optical system that forms a subject image on the solid-state imaging device. The solid-state imaging device includes: a pixel section in which a plurality of pixels performing photoelectric conversion are arranged in a matrix shape; and a pixel signal reading circuit that has an AD conversion section which reads pixel signals through a plurality of pixel units from the pixel section and performs analog digital (AD) conversion. The pixel signal reading circuit includes: a plurality of comparators each of which compares a reference signal, which is a ramp wave, with read analog signal potentials of pixels in a corresponding column; a plurality of counter latches each of which is disposed to correspond to each of the plurality of comparators, is able to count a comparison time of the corresponding comparator, stops the count when an output of the corresponding comparator is inverted, and retains a corresponding count value; and an adjustment section that performs offset adjustment on the reference signal for each row on which the AD conversion is performed.

According to the embodiments of the present disclosure, it is possible to suppress occurrence of quantization vertical streaks caused by the quantization error at the time of the AD conversion, and thereby it is also possible to improve image quality.

BRIEF DESCRIPTION OF THE DRAWINGS

FIG. 8 shows diagrams illustrating specific examples of DAC control based on pseudo-random numbers according to the embodiment;

FIG. 11 shows diagrams illustrating specific examples of the DAC control based on pseudo-random numbers, which make the offset values of the P-phase time and the D-phase time equal to each other, according to the embodiment.

DETAILED DESCRIPTION

Hereinafter, the embodiments of the present disclosure will be described with reference to the accompanying drawings.

Furthermore, the description will be given in order of the following items.

1. Exemplary Overall Configuration of Solid-State Imaging Device
2. Exemplary Configuration of Column ADC
3. Example of Reference Signal Formation Using DAC
4. Exemplary Configuration of Camera System FIG. 3 is a block diagram illustrating an exemplary configuration of a solid-state imaging device (a CMOS image sensor) equipped with column-parallel ADCs according to an embodiment of the present disclosure.

Figure 1:
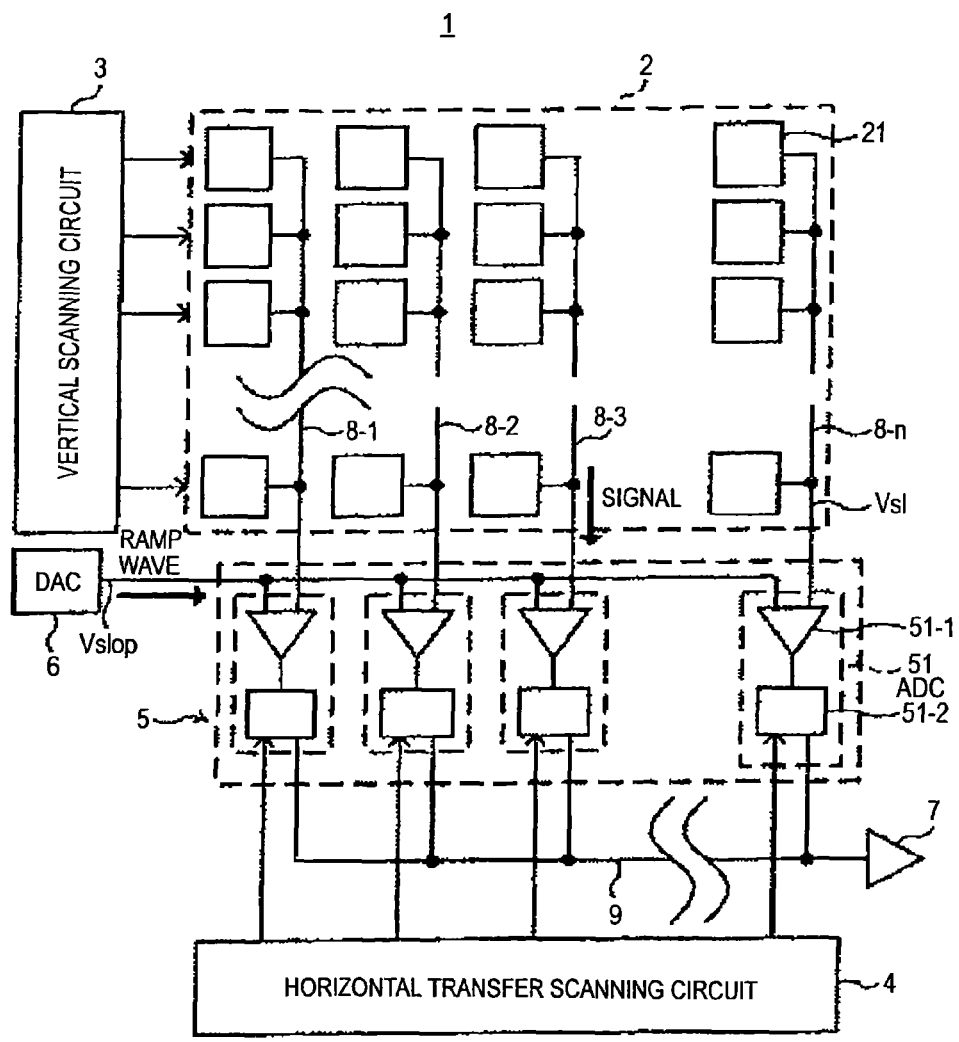
FIG. 1 is a block diagram illustrating an exemplary configuration of a solid-state imaging device (a CMOS image sensor) equipped with column-parallel ADCs.
Figure 2:
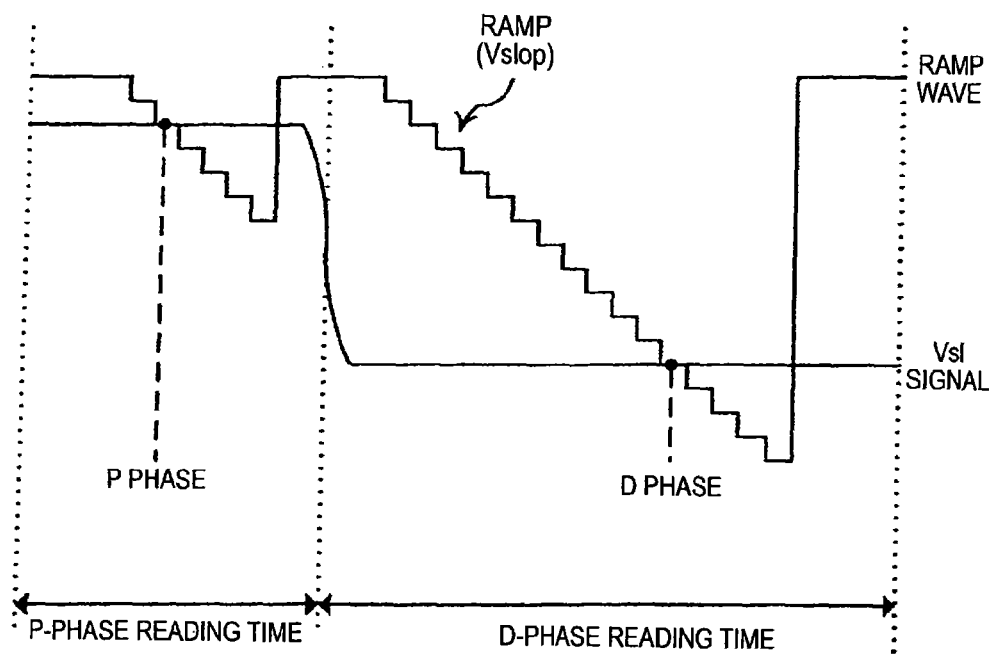
FIG. 2 is a diagram illustrating a timing chart of the circuit of FIG. 1.
Figure 3:
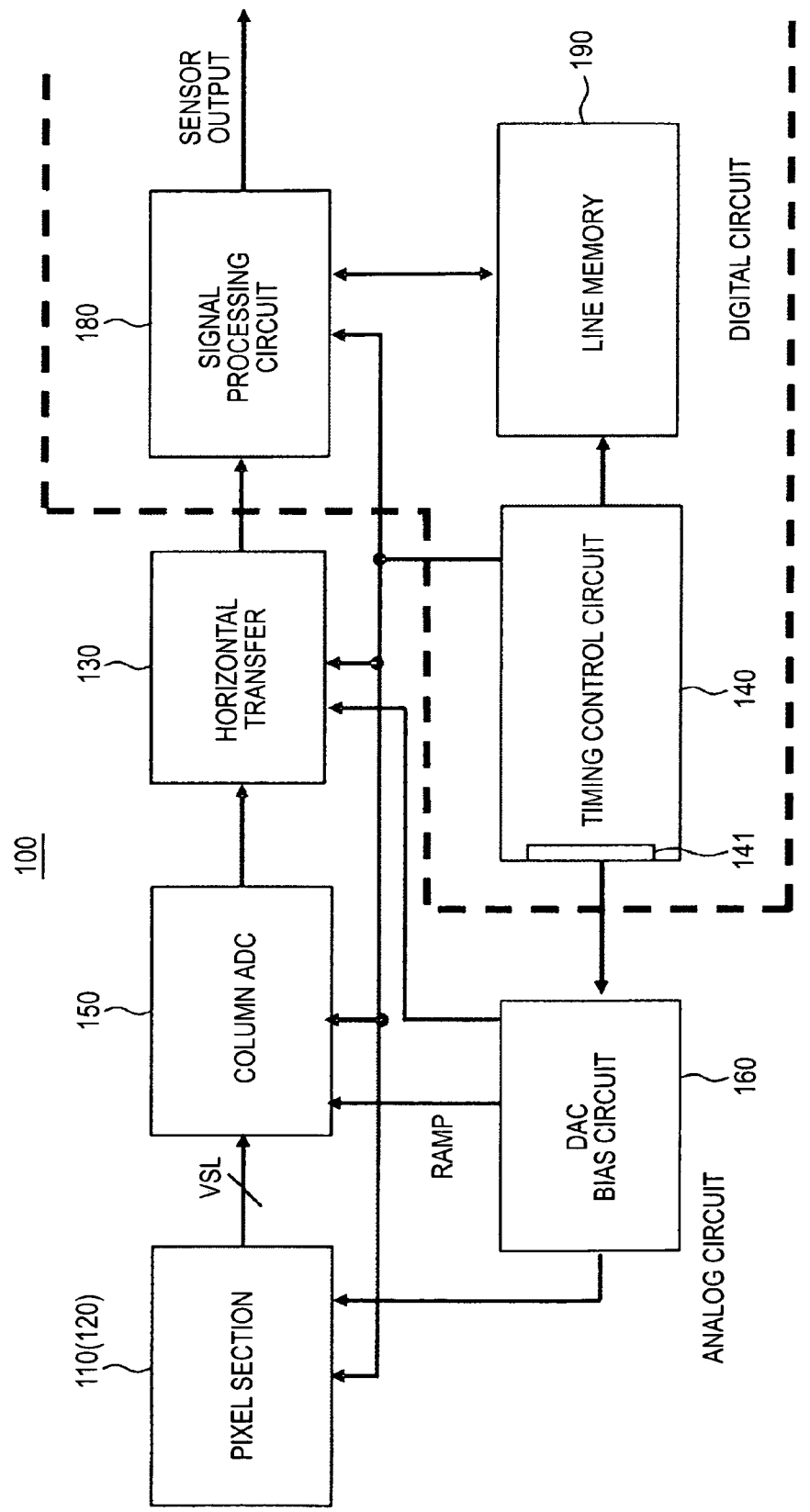
FIG. 3 is a block diagram illustrating an exemplary configuration of a solid-state imaging device (a CMOS image sensor) equipped with column-parallel ADCs according to an embodiment of the present disclosure.
Figure 4:
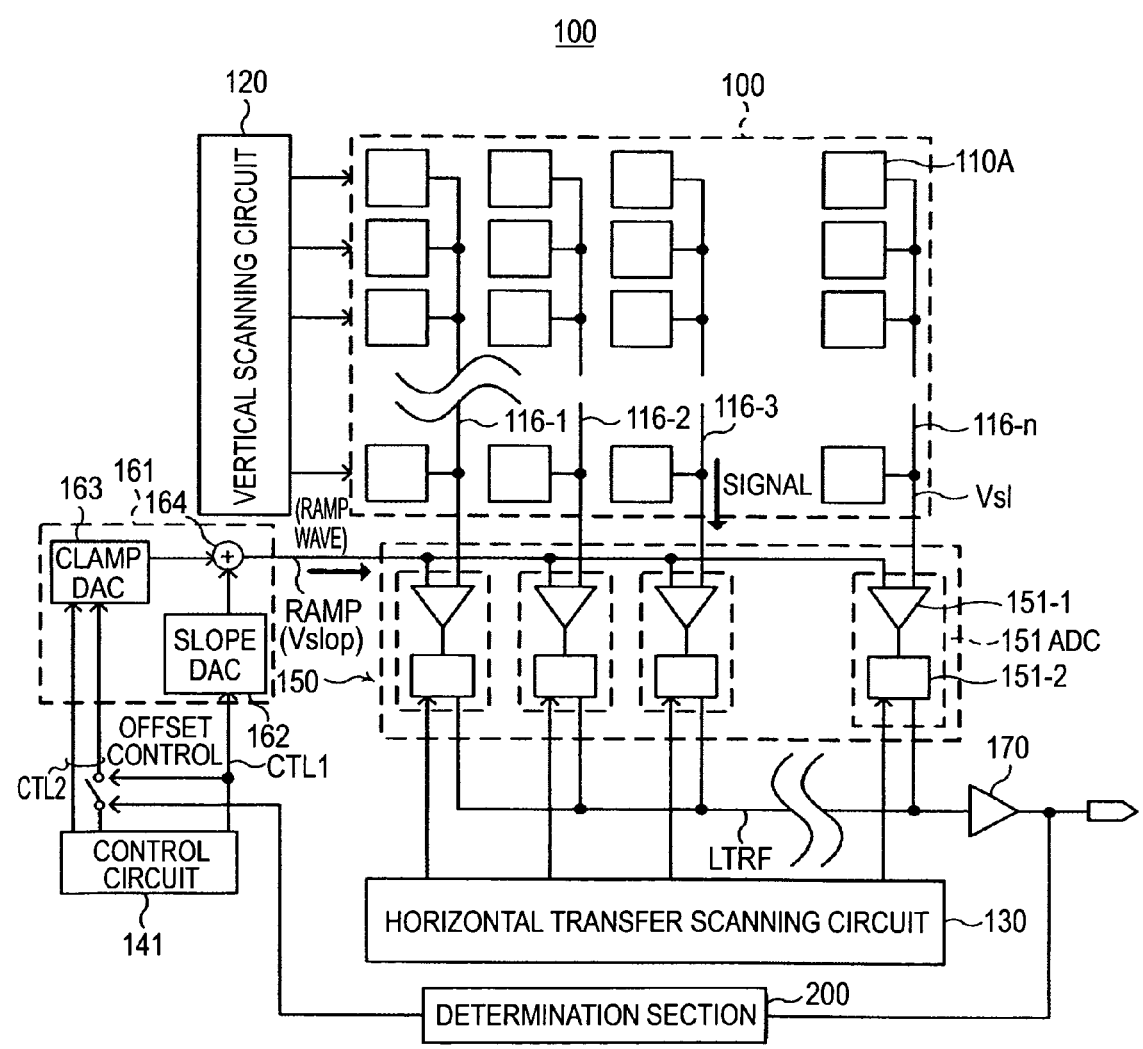
FIG. 4 is a block diagram more specifically illustrating the ADC group in the solid-state imaging device (a CMOS image sensor) equipped with column-parallel ADCs of FIG. 3.

FIG. 4 is a block diagram more specifically illustrating the ADC group in the solid-state imaging device (a CMOS image sensor) equipped with column-parallel ADCs of FIG. 3.

<1. Exemplary Overall Configuration of Solid-State Imaging Device>

A solid-state imaging device 100 includes a pixel section 110 as an imaging section, a vertical scanning circuit 120, a horizontal transfer scanning circuit 130, and a timing control circuit 140 as shown in FIG. 3 and FIG. 4.

The solid-state imaging device 100 further includes a column processing circuit group 150, which is an ADC group as a pixel signal reading section, and a DAC bias circuit 160 including a DAC (a digital-analog converter) 161.

The adjustment section is configured to have respective functions of the timing control circuit 140, the column processing circuit group (the ADC group) 150, and the DAC bias circuit 160.

The solid-state imaging device 100 includes an amplifier circuit (S/A) 170, a signal processing circuit 180, and a line memory 190.

In the above components, the pixel section 110, the vertical scanning circuit 120, the horizontal transfer scanning circuit 130, the column processing circuit group (the ADC group) 150, the DAC bias circuit 160, and the amplifier circuit (S/A) 170 are configured by analog circuits.

The timing control circuit 140, the signal processing circuit 180, and the line memory 190 are configured by digital circuits.

The solid-state imaging device 100 according to the embodiment further includes a determination section 200 that determines a luminance of a subject on the basis of the output of the amplifier circuit 170.

The determination result of the determination section 200 is used, as will be described later, in switching as to whether or not to perform the offset adjustment of the clamp DAC.

In the pixel section 110, a plurality of unit pixels 110A, each of which has a photodiode (a photoelectric conversion device) and an in-pixel amplifier, are arranged in a two-dimensional shape (a matrix shape) with m rows and n columns.

[Exemplary Configuration of Unit Pixel]

Figure 5:
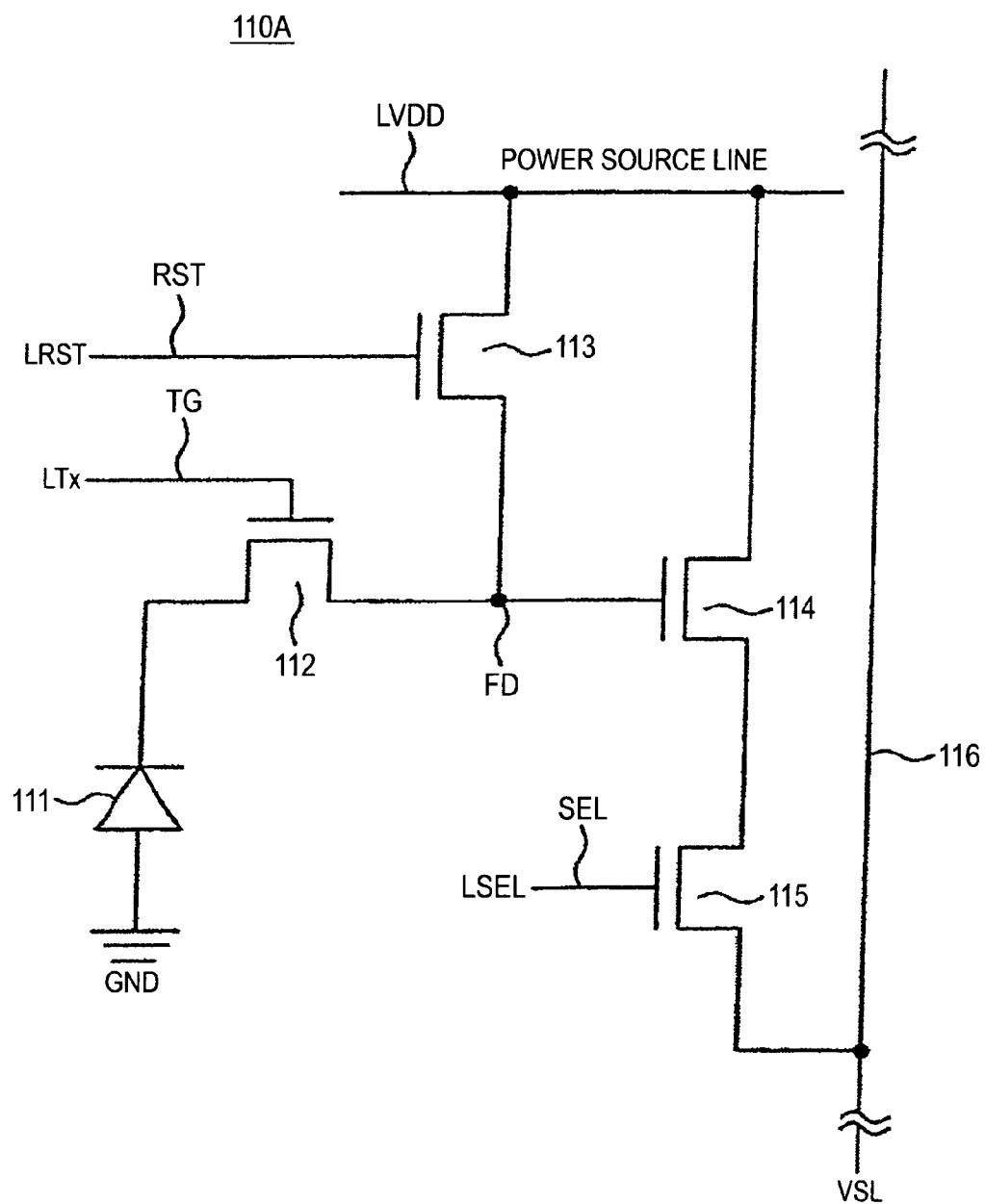
FIG. 5 is a diagram illustrating an exemplary pixel of a CMOS image sensor constituted by four transistors according to the embodiment.

FIG. 5 is a diagram illustrating an exemplary pixel of a CMOS image sensor constituted by four transistors according to the embodiment.

A unit pixel 110A includes, for example, a photodiode 111 as a photoelectric conversion device.

The unit pixel 110A further includes the following four transistors as active devices per photodiode 111: a transfer transistor 112 as a transfer device, a reset transistor 113 as a reset device, an amplifier transistor 114, and a selection transistor 115.

The photodiode 111 photoelectrically converts incident light into electric charges (here, electrons) of which the amount corresponds to the amount of the light.

The transfer transistor 112 is connected between the photodiode 111 and a floating diffusion FD as an output node.

The transfer transistor 112 transfers electrons, which are photoelectrically converted by the photodiode 111 as a photoelectric conversion device, to the floating diffusion FD when the gate (a transfer gate) thereof receives a driving signal TG through the transfer control line LTx.

The reset transistor 113 is connected between a power source line LVDD and a floating diffusion FD.

The reset transistor 113 resets the electric potential of the floating diffusion FD to the electric potential of the power source line LVDD when the gate thereof receives a reset signal RST through the reset control line LRST.

The floating diffusion FD is connected to the gate of the amplifier transistor 114. The amplifier transistor 114 is connected to a vertical signal line 116 through the selection transistor 115. The amplifier transistor 114 and a constant current source outside the pixel section constitute a source follower.

In addition, through the selection control line LSEL, a control signal (an address signal or a select signal) SEL can be given to the gate of the selection transistor 115, and thereby the selection transistor 115 is turned on.

When the selection transistor 115 is turned on, the amplifier transistor 114 amplifies the electric potential of the floating diffusion FD, and outputs the voltage Vsl corresponding to the electric potential to the vertical signal line 116. Through the vertical signal line 116, the voltage, which is output from each pixel, is output to the column processing circuit group 150 as a pixel signal reading section.

For example, the respective gates of the transfer transistor 112, the reset transistor 113, and the selection transistor 115 are connected on a row-by-row basis. Accordingly, such an operation is simultaneously performed, in parallel, on each pixel corresponding to a single row.

The reset control line LRST, the transfer control line LTx, and the selection control line LSEL are arranged in the pixel section 110 as one set for each row in the pixel arrangement.

The reset control line LRST, the transfer control line LTx, and the selection control line LSEL are driven by the vertical scanning circuit 120 as a pixel driving section.

In the solid-state imaging device 100, there are arranged the timing control circuit 140 which generates internal clocks as a control circuit for sequentially reading signals from the pixel section 110, the vertical scanning circuit 120 which controls row address and row scan, and the horizontal transfer scanning circuit 130 which controls column address and column scan.

The timing control circuit 140 generates timing signals necessary for signal processing in the pixel section 110, the vertical scanning circuit 120, the horizontal transfer scanning circuit 130, the column processing circuit group 150, the DAC bias circuit 160, the signal processing circuit 180, and the line memory 190.

The timing control circuit 140 includes a DAC control section 141 which controls the generation of the reference signal RAMP (Vslop) of a DAC 161 in the DAC bias circuit 160.

The DAC control section 141 performs control so as to adjust the offset of the reference signal RAMP for each row on which the AD conversion of each column processing circuit (ADC) 151 of the column processing circuit group 150 is performed.

The DAC control section 141 is able to perform control, at the time of CDS (Correlated Double Sampling) in the column processing circuit group 150, so as to adjust the offsets of the respective reference signals RAMP of primary sampling (P-phase time) and secondary sampling (D-phase time).

At this time, the DAC control section 141 adds the offset signal (less than ±0.5 LSB), which is random for each row, to the reference signal RAMP at the P-phase time, at the D-phase time, or at both of the P-phase time and D-phase time. In this case, noise is superposed, and as a result, the true value thereof is changed.

Further, the DAC control section 141 also employs, as a method by which the true value is invariant, a method of applying an offset signal to the input portion of each comparator not at the time of P phase and D phase but only at the time of initialization processing (auto zero (AZ)) which determines an operating point for each column at the time of starting a row operation.

The pixel section 110 photoelectrically converts video and screen images for each pixel row through photon accumulation and discharge using a line shutter, thereby outputting the analog signal VSL to each column processing circuit 151 of the column processing circuit group 150.

In the ADC group 150, each ADC block (each column section) subjects an analog output of the pixel section 110 to APGA-adaptable integrated ADC and digital CDS using the reference signal (the ramp signal) RAMP from the DAC 161, and outputs a digital signal of several bits.

<2. Exemplary Configuration of Column ADC>

In the column processing circuit group 150 according to the embodiment, the column processing circuits (ADCs) 151 as ADC blocks are arrayed in a plurality of columns.

Specifically, the column processing circuit group 150 has a k-bit digital signal conversion function. The column processing circuits (ADC) 151 are arranged in respective vertical signal lines (column lines) 116-1 to 116-n, thereby constituting column-parallel ADC blocks.

Each ADC 151 has a comparator 151-1 that compares the reference signal RAMP (Vslop), which has a ramp waveform obtained when a reference signal generated by the DAC 161 is changed in a stepwise manner, with the analog signal Vsl which is obtained from pixels of each row line through a vertical signal line.

Each ADC 151 further includes a counter latch 151-2 that counts the comparison time and retains the count results.

Outputs of the respective counter latches 151-2 are connected to a horizontal transfer line LTRF having, for example, a k-bit width.

In addition, the k amplifier circuits 170 corresponding to the horizontal transfer line LTRF and the signal processing circuit 180 are arranged.

In the ADC group 150, each comparator 151-1, which is disposed for each column, compares the analog signal potential Vsl, which is read to the vertical signal lines 116, with the reference signal Vslop (the ramp signal RAMP with a slope waveform which linearly changes and has a certain slope).

At this time, similarly to the comparator 151-1, the counter latch 151-2 disposed for each column is operating.

When the reference signal RAMP (the electric potential Vslop) with a ramp waveform and counter values change while corresponding one-to-one with each other, the ADCs 151 convert the electric potentials (the analog signals) Vsl of the vertical signal lines 116 into digital signals.

The ADCs 151 convert a change in the voltage of the reference signal RAMP (the potential Vslop) into a change in time, and convert the time into a digital value by counting the time at a certain period (clock).

When the analog signals Vsl and the reference signal RAMP (Vslop) intersect each other, outputs of the comparators 151-1 are inverted, and input clocks of the counter latches 151-2 are stopped, or clocks stopped to be input are input to the counter latches 151-2, thereby completing the AD conversion.

After the AD conversion period mentioned above ends, the horizontal transfer scanning circuit 130 transfers data, which is held in the counter latches 151-2, to the horizontal transfer line LTRF, and inputs the data to the signal processing circuit 180 through the amplifiers 170, thereby generating a two-dimensional image through predetermined signal processing.

The horizontal transfer scanning circuit 130 performs multi-channel simultaneous parallel transfer in order to secure transfer speed.

The timing control circuit 140 generates a timing necessary for signal processing in the blocks of the pixel section 110, the column processing circuit group 150, and the like.

The signal processing circuit 180 at a subsequent stage performs correction of vertical line defects or point detects from signals which are stored in the line memory 190, performs clamp processing for the signals, and performs digital signal processing such as parallel-serial conversion, compression, encoding, addition, averaging, and intermittent operation.

The digital signal transmitted for each pixel row is stored in the line memory 190.

In the solid-state imaging device 100 according to the embodiment, a digital output of the signal processing circuit 180 is transmitted as an input to an ISP or a baseband LSI.

Here, a description will be given of the configuration and the function of each comparator 151 which performs the initialization processing (the auto zero processing) in the ADC group (the pixel signal reading circuit group) 150 according to the embodiment.

Hereinafter, the comparator is represented by the reference numeral 300.

Figure 6:
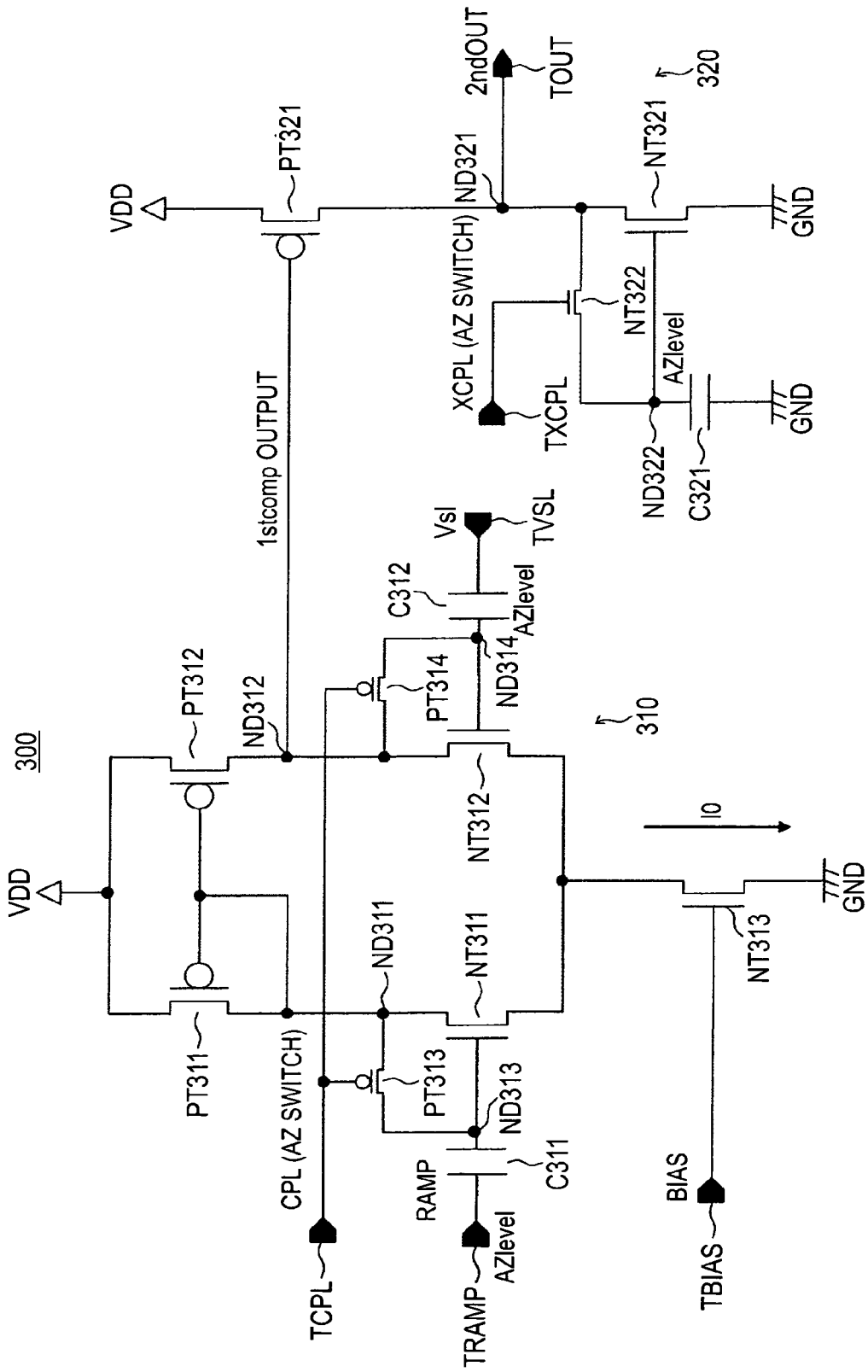
FIG. 6 is a circuit diagram illustrating an exemplary configuration of a comparator according to the embodiment.

FIG. 6 is a circuit diagram illustrating an exemplary configuration of a comparator according to the embodiment.

In the comparator 300, as shown in FIG. 6, a first amplifier and a second amplifier are connected in cascade. The first amplifier 310 performs a low-speed signal comparison operation to narrow an operation bandwidth at the first stage, and the second amplifier 320 increases a gain of the output of the first amplifier 310.

The first amplifier 310 includes p-channel MOS (PMOS) transistors PT311 to PT314 and n-channel MOS (NMOS) transistors NT311 to NT313.

The first amplifier 310 includes a first capacitor C311 and a second capacitor C312 as AZ-level sampling capacitances.

The sources of the PMOS transistors PT311 and PT312 are connected to a power source potential VDD.

The drain of the PMOS transistor PT311 is connected to the drain of the NMOS transistor NT311, and a connection point therebetween constitutes a node ND311. Further, the drain and gate of the PMOS transistor PT311 are connected, and a connection point therebetween is connected to the gate of the PMOS transistor PT312.

The drain of the PMOS transistor PT312 is connected to the drain of the NMOS transistor NT312, and a connection point therebetween constitutes an output node ND312 of the first amplifier 310.

The emitters of the NMOS transistors NT311 and NT312 are connected to each other, and a connection point therebetween is connected to the drain of the NMOS transistor NT313. The source of the NMOS transistor NT313 is connected to a ground potential GND.

The gate of the NMOS transistor NT311 is connected to a first electrode of the capacitor C311, and a connection point therebetween constitutes a node ND313. In addition, a second electrode of the capacitor C311 is connected to an input terminal TRAMP for a ramp signal RAMP.

The gate of the NMOS transistor NT312 is connected to a first electrode of the capacitor C312, and a connection point therebetween constitutes a node ND314. In addition, a second electrode of the capacitor C312 is connected to an input terminal TVSL for an analog signal VSL.

Further, the gate of the NMOS transistor NT313 is connected to an input terminal TBIAS for a bias signal BIAS.

The source of the PMOS transistor PT313 is connected to the node ND311, and the drain thereof is connected to the node ND313. The source of the PMOS transistor PT314 is connected to the node ND312, and the drain thereof is connected to the node ND314.

In addition, the gates of the PMOS transistors PT313 and PT314 are connected in common to an input terminal TCPL of the first control pulse CPL which is active at a low level.

In the first amplifier 310 having the above-mentioned configuration, the PMOS transistors PT311 and PT312 constitute a current mirror circuit.

Moreover, the NMOS transistors NT311 and NT312 constitute a differential comparison section using the NMOS transistor NT313 as a current source.

In addition, the gate of the NMOS transistor NT311 constitutes the first signal input terminal, and the gate of the NMOS transistor NT312 constitutes the second signal input terminal.

Further, the PMOS transistors PT313 and PT314 function as the AZ switches, and the capacitors C311 and C312 function as the AZ-level sampling capacitances.

In addition, an output signal 1stcomp of the first amplifier 310 is output from the output node ND312 to the second amplifier 320.

The second amplifier 320 has the PMOS transistor PT321, the NMOS transistors NT321 and NT322, and the AZ-level sampling capacitance C321.

The source of the PMOS transistor PT321 is connected to the power source potential VDD, and the gate thereof is connected to the output node ND312 of the first amplifier 310.

The drain of the PMOS transistor PT321 is connected to the drain of the NMOS transistor NT321, and a connection point therebetween constitutes an output node ND321.

The source of the NMOS transistor NT321 is connected to the ground potential GND, and the gate thereof is connected to a first electrode of the capacitor C321, and a connection point therebetween constitutes a node ND322. A second electrode of the capacitor C321 is connected to the ground potential GND.

The drain of the NMOS transistor NT322 is connected to the node ND321, and a source is connected to the node ND322.

In addition, the gate of the NMOS transistor NT322 is connected in common to an input terminal TXCPL of a second control pulse XCPL which is active at a high level.

The second control pulse XCPL takes a level complementary to the first control pulse signal CPL which is supplied to the first amplifier 310.

In the second amplifier 320 having the above-mentioned configuration, the PMOS transistor PT321 constitutes an input circuit and a current source circuit.

Further, the NMOS transistor NT322 functions as the AZ switch, and the capacitor C321 functions as the AZ-level sampling capacitance.

In addition, the output node ND321 of the second amplifier 320 is connected to an output terminal TOUT of the comparator 300.

Next, the operation of the comparator 300 according to the embodiment will be described.

In the comparator 300, during a calibration period (an AZ period), in order to determine the operating point for each column when the row operation is started, the first control pulse signal CPL is supplied at the low level, and the second control pulse XCPL is supplied at the high level.

Thereby, the PMOS transistors PT313 and PT314 as the AZ switches of the first amplifier 310 are turned on. Likewise, the NMOS transistor NT322 as the AZ switch of the second amplifier 320 is turned on.

As described above, in the ADC group 150, by using the comparator 300, first, a DAC offset level, a pixel reset level, and an AZ level of each column are sampled, and the electric charges are accumulated in the capacitors C311, C312, and C321 which are the AZ-level sampling capacitances.

In the control pulse CPL which is supplied during the calibration period, for example, the amplitude thereof is given such that a voltage Vgs, which is necessary when an AZ switching transistor for initialization (calibration) is turned on, is always set to a minimum necessary voltage.

In such a manner, in the embodiment, the amount of the offset generated is minimized. As a result, a fluctuation range in the amount of the offset is also suppressed.

Next, the P-phase operation is performed. In response to receiving a reset signal RST of the pixel, the analog signal VSL is changed, and is compared with the ramp signal RAMP from the DAC 161, theieby performing the AD conversion for each column.

The output of the comparator 300 is changed at the time of intersecting a coupled signal of the analog signal VSL with the ramp signal RAMP to be supplied to the nodes ND313 and ND314 of the first amplifier 310 which has became a high impedance (HiZ) after the AZ operation of the comparator 300. The AD conversion is performed by controlling the counter operation at the subsequent stage on the basis of the output of the comparator 300.

For example, immediately after the P-phase period is started, the output signal compout of the comparator 300 is temporarily changed to the low level, and is then changed to the high level at the time of intersecting the RAMP wave with the analog signal VSL.

Next, a D-phase operation is performed. The AD conversion is performed in the same path as the P phase. However, as compared with the P-phase operation, an amount of signal photoelectrically converted in the pixel in the D-phase operation is larger, and thus a dynamic range of the AD conversion is generally expanded.

Hence, when the AD conversion is performed at the same gradation as the P-phase RAMP wave, the D-phase period becomes longer than the P-phase period.

In this case, the output of the comparator 300 is also changed at the time of intersecting a coupled signal of the analog signal VSL with the ramp signal RAMP to be supplied to the nodes ND313 and ND314 of the first amplifier 310 which has became a high impedance (HiZ) after the AZ operation of the comparator 300. The AD conversion is performed, similarly to the case of the P-phase, by controlling the counter operation at the subsequent stage on the basis of the output of the comparator 300.

In this case, immediately after the P-phase period is finished, the output signal compout of the comparator 300 is changed to the low level again, and is then changed to the high level at the time of intersecting the RAMP wave with the analog signal VSL during the D-phase period.

As described above, since the AZ, the P-phase, and the D-phase operations are performed in duplicate for each column in the same path in each row operation, intrinsic variations of the respective columns or kTC noise are removed through the analog CDS.

Further, as a method used for pixel signal reading of the CMOS image sensor, there is a method by which signal charges to be used as an optical signal generated by a photoelectric conversion device, such as a photodiode, are temporarily sampled through a MOS switch, which is disposed near the photoelectric conversion device, in a capacitance in the front thereof, and the signal charges are read.

In the sampling circuit, noise values having inverse correlation to a sampling capacitor value are generally superposed. In a pixel, when signal charges are transferred to the sampling capacitance, the signal charges are fully transferred by using a potential gradient. Hence, noise will not occur in the sampling process, but noise values are superposed when a voltage level of capacitance at the previous stage of the sampling is reset to a certain reference value.

In order to remove the noise, the CDS is generally used.

As described above, in the CDS, a state (a reset level) immediately before the sampling of signal charges is read and stored, then a signal level after the sampling is read, and the read signal level is subtracted from that of the stored charges, thereby eliminating the noise.

The DAC 161 generates, under the control of the DAC control section 141, a reference signal (a ramp signal) with a slope waveform which linearly changes and has a certain slope, and supplies the reference signal RAMP to the column processing circuit group 150.

The DAC 161 generates, under the control of the DAC control section 141, the reference signal RAMP subjected to offset adjustment for each row on which the AD conversion of each column processing circuit (ADC) 151 of the column processing circuit group 150 is performed.

The DAC 161 generates, under the control of the DAC control section 141, during the CDS in the column processing circuit group 150, the reference signal RAMP subjected to the offset adjustment during sampling processing in each of the primary sampling and the secondary sampling.

The DAC 161 adds, under the control of the DAC control section 141, the offset signal (less than ±0.5 LSB), which is random for each row, to the reference signal RAMP at the P-phase time (the primary sampling), at the D-phase time (the secondary sampling), or at both of the P-phase time and D-phase time. In this case, noise is superposed, and as a result, the true value thereof is changed.

Further, the DAC 161 applies, under the control of the DAC control section 141, the offset signal not applied at the time of the P phase and D phase but only applied at the time of auto zero (AZ) so as not to change the true value.

The DAC 161 is configured, as shown in FIG. 4, to include a ramp DAC (slope DAC) 162, a clamp DAC 163, and an adder section 164.

<3. Example of Reference Signal Formation Using DAC>

Figure 7:
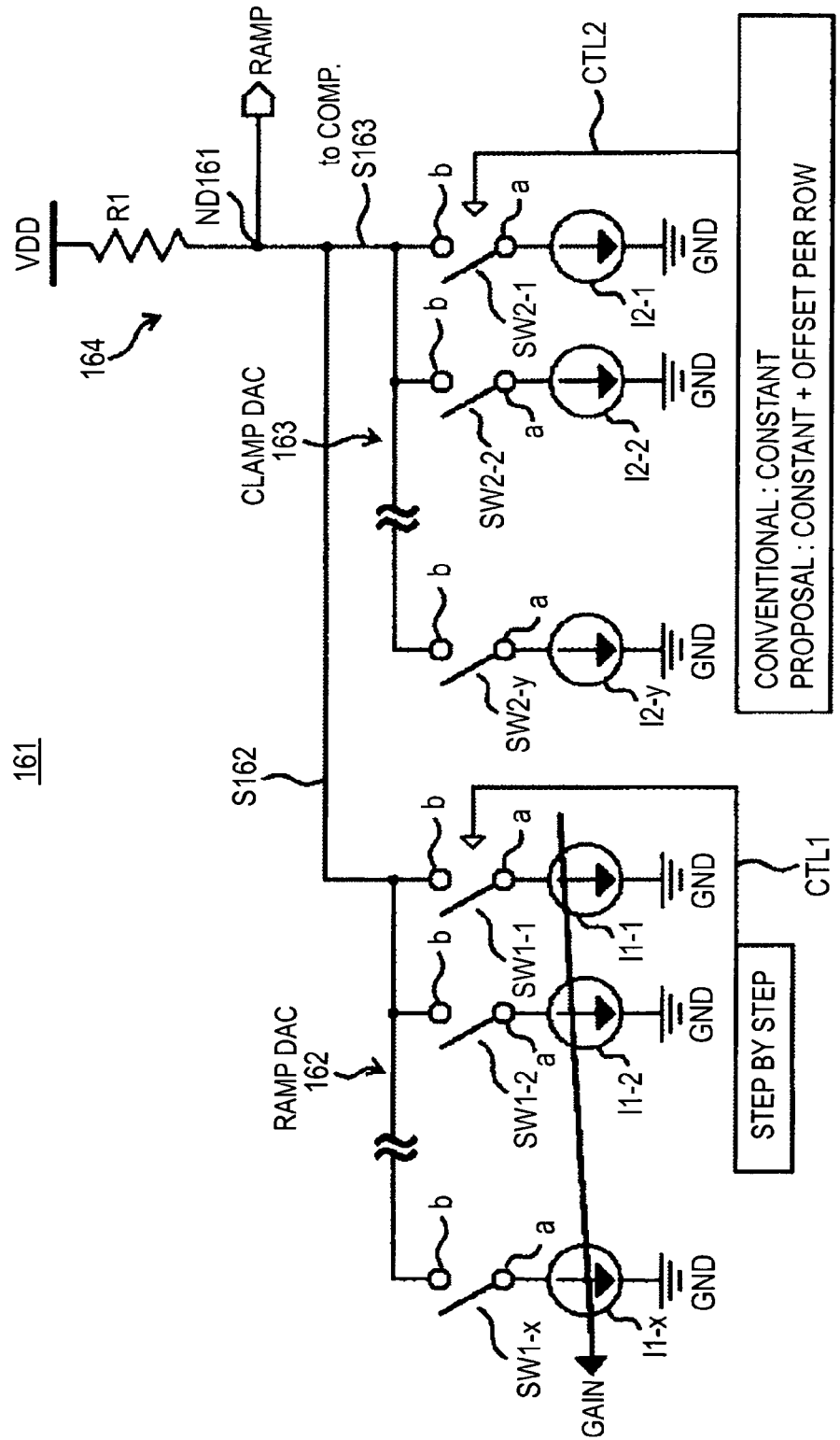
FIG. 7 is a diagram illustrating a basic exemplary configuration of a current control DAC according to the embodiment.

FIG. 7 is a diagram illustrating a basic exemplary configuration of a current control DAC according to the embodiment.

The current control DAC 161 is configured as a power source reference type DAC having a power source VDD as a reference. The current control DAC 161 can also be configured as a ground reference type DAC having a ground GND as a reference.

Specifically, one end of a reference resistor R1 is connected to the power source VDD, and the other end of the reference resistor R1 is connected to an output of the ramp DAC 162 and an output of the clamp DAC 163. A ramp output node ND 161 is formed by a connection point of the outputs.

The reference resistor R1 and the output node ND 161 constitute an adder section 164.

The ramp DAC 162 includes x current sources I1-1 to I1-$x$ and switches SW1-1 to SW1-$x$.

Terminals a of the switches SW1-1 to SW1-$x$ are respectively connected to the current sources 11-1 to 11-$x$ connected to the ground GND.

Terminals b of the switches SW1-1 to SW1-$x$ are connected in common to the output node ND 161.

The switches SW1-1 to SW1-$x$ are selectively turned on and off according to a control signal CTL1 generated by the DAC control section 141.

The clamp DAC 163 includes y current sources 12-1 to 12-$y$ and switches SW2-1 to SW2-$y$.

Terminals a of the switches SW2-1 to SW2-$y$ are respectively connected to the current sources 12-1 to 12-$y$ connected to the ground GND.

Terminals b of the switches SW2-1 to SW2-$y$ are connected in common to the output node ND 161.

The switches SW2-1 to SW2-$y$ are selectively turned on and off according to a control signal CTL2 generated by the DAC control section 141.

In the clamp DAC 163, current output including not only a fixed value corresponding to the control signal CTL2 but also an offset value is performed.

In the DAC 161, as shown in FIG. 7, the reference signal RAMP (the ramp wave) in the integrated ADC is generated by adding up an output signal S162 of the ramp DAC 162 and an output signal S163 of the clamp DAC 163 for DC level control.

In the control method in the existing technique, at the time of performing the AD conversion for each row, a reference signal is generated with an output signal of the clamp DAC 163 set as a fixed value.

Hence, when there is a difference in the way of rounding in the AD conversion in the primary sampling and the secondary sampling among the columns, there is concern about vertical streaks caused by a quantization error.

In the embodiment, at the time of performing the AD conversion for each row, the output signal S163 of the clamp DAC 163 is not fixed (that is, the control signal is not set as a fixed value) and the control signal CTL2 based on pseudo-random numbers is used.

In the embodiment, in a first method, the control based on pseudo-random numbers is performed at the P-phase time (the primary sampling), at the D-phase time (the secondary sampling), or at the P-phase time and D-phase time (both samplings). In other words, in the first method, by changing the true value, the way of rounding (quantization) in the AD conversion is changed.

In the embodiment, in a second method, the offset signal is not applied at the time of the P phase (the primary sampling) and D phase (the secondary sampling) but only applied at the time of auto zero (AZ) so as not to change the true value.

Specific examples of the DAC control based on pseudo-random numbers will be described below.

FIG. 8 shows diagrams illustrating specific examples of DAC control based on pseudo-random numbers according to the embodiment.

Part (A) in FIG. 8 shows the case where the offset adjustment is not applied. Part (B) in FIG. 8 shows the case where the offset adjustment is applied.

In FIG. 8, part (X) indicates analog values before the AD conversion, part (Y) indicates digital values after the AD conversion, and part (Z) indicates values after the CDS.

In this example, in a P phase in the case where the offset adjustment is not applied, a digitally-converted analog value in "a" row and "A" column is "0.9", a digitally-converted analog value in row and "A" column is "0.7", and a digitally-converted analog value in "c" row and "A" column is "0.9".

A digitally-converted analog value in "a" row and "B" column is "0.4", a digitally-converted analog value in "b" row and "B" column is "0.5", and a digitally-converted analog value in "c" row and "B" column is "0.3".

A digitally-converted analog value in "a" row and "C" column is "1.6", a digitally-converted analog value in "b" row and "C" column is "1.5", and a digitally-converted analog value in "c" row and "C" column" is "1.4".

For example, as shown in FIG. 8, offset values are set such that a set value in the "a" row is set to be equivalent to +0.3 LSB (the control is originally analog control but, for easier understanding, the value is digitally converted), +0.2 LSB in the next "b" row, and 0.1 LSB in the next "c" row.

As a result, in the P phase, the digitally-converted analog value in "a" row and "A" column changes from "0.9" to "1.2", the digitally-converted analog value in "b" row and "A" column changes from "0.7" to "0.9", and the digitally-converted analog value in "c" row and "A" column changes from "0.9" to "1.0".

The digitally-converted analog value in "a" row and "B" column changes from "0.4" to "0.7", the digitally-converted analog value in "b" row and "B" column changes from "0.5" to "0.7", and the digitally-converted analog value in "c" row and "B" column changes from "0.3" to "0.4".

The digitally-converted analog value in "a" row and "C" column changes from "1.6" to "1.9", the digitally-converted analog value in "b" row and "C" column changes from "1.5" to "1.7", and the digitally-converted analog value in "c" row and "C" column changes from "1.4" to "1.5".

In a D phase in the case without the offset adjustment, a digitally-converted analog value in "a" row and "A" column is "1.2", a digitally-converted analog value in "b" row and "A" column is "1.1", and a digitally-converted analog value in "c" row and "A" column is "1.3".

A digitally-converted analog value in "a" row and "B" column is "0.8", a digitally-converted analog value in "b" row and "B" column is "0.8", and a digitally-converted analog value in "c" row and "B" column is "0.6".

A digitally-converted analog value in "a" row and "C" column is "1.9", a digitally-converted analog value in "b" row and "C" column is "1.6", and a digitally-converted analog value in "c" row and "C" column is "1.7".

For example, as shown in FIG. 8, offset values are set such that a set value in the "a" row is set to be equivalent to +0.1 LSB (the control is originally analog control but, for easier understanding, the value is digitally converted), +0.0 LSB in the next "b" row, and 0.0 LSB in the next "c".

As a result, in the D phase, the digitally-converted analog value in "a" row and "A" column changes from "1.2" to "1.3", the digitally-converted analog value in "b" row and "A" column remains at "1.1", and the digitally-converted analog value in "c" row and "A" column remains at "1.3".

The digitally-converted analog value in "a" row and "B" column changes from "0.8" to "0.9", the digitally-converted analog value in "b" row and "B" column remains at "0.8", and the digitally-converted analog value in "c" row and "B" column remains at "0.6".

The digitally-converted analog value in "a" row and "C" column changes from "1.9" to "2.0", the digitally-converted analog value in "b" row and "C" column remains at "1.6", and the digitally-converted analog value in "c" row and "C" column remains at "1.7".

In the case where the offset adjustment is not applied, digital values after the AD conversion are as described below.

In the P phase, the digitally-converted analog value "0.9" in "a" row and "A" column changes to a digital value "0", the digitally-converted analog value "0.7" in "b" row and "A" column changes to a digital value "0", and the digitally-converted analog value "0.9" in "c" row and "A" column changes to a digital value "0".

The digitally-converted analog value "0.4" in "a" row and "B" column changes to a digital value "0", the digitally-converted analog value "0.5" in "b" row and "B" column changes to a digital value "0", and the digitally-converted analog value "0.3" in "c" row and "B" column changes to a digital value "0".

The digitally-converted analog value "1.6" in "a" row and "C" column changes to a digital value "1", the digitally-converted analog value "1.5" in "b" row and "C" column changes to a digital value and the digitally-converted analog value "1.4" in "c" row and "C" column changes to a digital value "1".

In the D phase, the digitally-converted analog value "1.2" in "a" row and "A" column changes to a digital value "1", the digitally-converted analog value "1.1" in "b" row and "A" column changes to a digital value "1", and the digitally-converted analog value "1.3" in "c" row and "A" column changes to a digital value "1".

The digitally-converted analog value "0.8" in "a" row and "B" column changes to a digital value "0", the digitally-converted analog value "0.8" in "b" row and "B" column changes to a digital value "0", and the digitally-converted analog value "0.6" in "c" row and "B" column changes to a digital value "0".

The digitally-converted analog value "1.9" in "a" row and "C" column changes to a digital value "1", the digitally-converted analog value "1.6" in "b" row and "C" column changes to "1", and the digitally-converted analog value "1.7" in "c" row and "C" column changes to a digital value "1".

In addition, digital values after the CDS are as described below.

The digital value in "a" row and "A" column changes to "1", the digital value in "b" row and "A" column changes to "1", and the digital value in "c" row and "A" column changes to "1".

The digital value in "a" row and "B" column changes to "0", the digital value in "b" row and "B" column changes to "0", and the digital value in "c" row and "B" column changes to "0".

The digital value in "a" row and "C" column changes to "0", the digital value in "b" row and "C" column changes to "0", and the digital value in "c" row and "C" column changes to "0".

In this case, in the "A" column, since correlation among the rows is high, it is likely that the quantization error appears as fixed vertical streaks.

In the case where the offset adjustment is applied, digital values after the AD conversion are as described below.

In the P phase, a digitally-converted analog value "1.2" in "a" row and "A" column changes to a digital value "1", a digitally-converted analog value "0.9" in "b" row and "A" column changes to a digital value "0", and a digitally-converted analog value "1.0" in "c" row and "A" column changes to a digital value "1".

A digitally-converted analog value "0.7" in "a" row and column changes to a digital value "0", a digitally-converted analog value "0.7" in "b" row and "B" column changes to a digital value "0", and a digitally-converted analog value "0.4" in "c" row and "B" column changes to a digital value "0".

A digitally-converted analog value "1.9" in "a" row and "C" column changes to a digital value a digitally-converted analog value "1.7" in "b" row and "C" column changes to a digital value "1", and a digitally-converted analog value "1.5" in "c" row and "C" column changes to a digital value "1".

In the D phase, a digitally-converted analog value "1.3" in "a" row and "A" column changes to a digital value "1", a digitally-converted analog value "1.1" in "b" row and "A" column changes to a digital value and a digitally-converted analog value "1.3" in "c" row and "A" column changes to a digital value "1".

A digitally-converted analog value "0.9" in "a" row and "B" column changes to a digital value "0", a digitally-converted analog value "0.8" in "b" row and "B" column changes to a digital value "0", and a digitally-converted analog value "0.6" in "c" row and "B" column changes to a digital value "0".

A digitally-converted analog value "2.0" in "a" row and "C" column changes to a digital value a "2", a digitally-converted analog value "1.6" in "b" row and "C" column changes to a digital value "1", and a digitally-converted analog value "1.7" in "c" row and "C" column changes to a digital value "1".

In addition, digital values after the CDS are as described below.

The digital value in "a" row and "A" column changes to "0", the digital value in "b" row and "A" column changes to "1", and the digital value in "c" row and "A" column changes to "0".

The digital value in "a" row and "B" column changes to "0", the digital value in "b" row and "B" column changes to "0", and the digital value in "c" row and "B" column changes to "0".

The digital value in "a" row and "C" column changes to "1", the digital value in "b" row and "C" column changes to "0", and the digital value in "c" row and "C" column changes to "0".

In this case, in the respective columns, correlation among the rows is not high, and thus there is no concern about occurrence of the fixed vertical streaks.

As described in the embodiment, when the offset adjustment is performed on the output of the clamp DAC 163, the output of the clamp DAC 163 changes.

When the output of the clamp DAC 163 changes, a level of the entire reference signal RAMP shifts for each sampling. As a result, a time until outputs of the comparators 151-1 are inverted is advanced or delayed, and output values of the counters increase or decrease.

In this case, a clamp DAC, which reduces increase or decrease width of the output value of the counter latch 151-2 to less than 1 LSB (adjustment sufficient for changing a way of rounding during the AD conversion: ±0.5 LSB), is mounted, whereby it is possible to suppress occurrence of quantization vertical streaks after the CDS.

An effect of the offset adjustment is equivalent to that of dither processing. However, it is possible to realize the offset adjustment in analog processing by contriving the existing circuit without a subsequent processing.

Here, the integrated ADC measures, as a signal value, time until outputs of the comparators are inverted.

In addition, the output value of each counter latch 151-2 is an output value after the CDS.

As described above, the solid-state imaging device 100 according to the embodiment includes the determination section 200 that determines the luminance of a subject from an output of the amplifier circuit 170.

As described later, a determination result of the determination section 200 is used for switching whether or not the offset adjustment of the clamp DAC is performed.

For example, if the luminance is higher than a certain threshold and the reference signal RAMP output from the DAC 161 is set to a high gain, the determination section 200 turns off a switch SW3, and controls the output of the clamp DAC 163 to be set to a fixed value.

In contrast, if the luminance is lower than the certain threshold and the reference signal RAMP output from the DAC 161 is set to a low gain, the determination section 200 turns on the switch SW3, and controls the output of the clamp DAC 163 to be subjected to the offset adjustment rather than being set to a fixed value.

When the gain is adjusted (an output signal is amplified), the slope of the reference signal RAMP as the ramp wave is changed, and the time until outputs of the comparators are inverted is adjusted. However, the change of the slope of the reference signal RAMP means a change of resolution.

In general, quantization vertical streaks appear more in an image as the resolution becomes lower. Therefore, if control for causing the offset adjustment function to work is performed in use at the low gain, this is effective since image quality is not spoiled when a quantization error does not occur.

Further, since vertical streaks are conspicuous in a dark time, control for causing the offset adjustment function to work when an amount of light is small is also effective.

Figure 9:
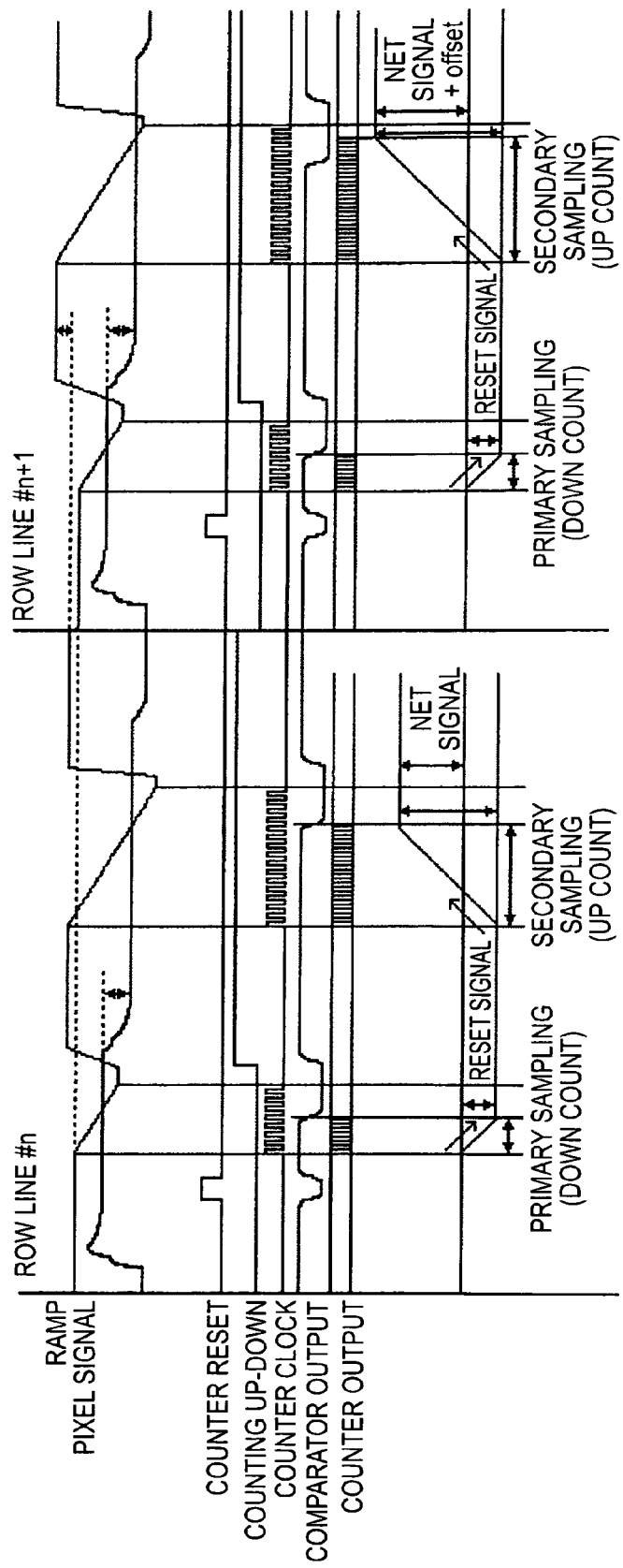
FIG. 9 is a diagram illustrating an operation waveform in a case where an offset adjustment function is selectively applied to each row.

FIG. 9 is a diagram illustrating an operation waveform in a case where an offset adjustment function is selectively applied to each row.

In the example shown in FIG. 9, the offset adjustment function is not applied to an n-th row, and the offset adjustment function is applied to a (n+1) th row.

Operation based on the configuration described above is described below.

In the description of the following example, the offset adjustment of the clamp DAC output is performed in the P phase and the D phase.

This is only an example. Accordingly, it is also possible to perform the offset adjustment control based on pseudo-random numbers in the primary sampling, the secondary sampling, or both the samplings. It is also possible selectively perform the offset adjustment control for each row.

At the P-phase time, the DAC 161 adds up the output signal S163 of the clamp DAC 163 for DC level control and the output signal S162 of the ramp DAC 162 subjected to the offset adjustment, and generates the reference signal RAMP (Vslop).

In each column processing circuit (ADC) 151, the comparator 151-1, which is disposed for each column, compares the analog signal potential Vsl, which is read to the vertical signal line 116, with the reference signal RAMP.

Until levels of the analog potential Vsl and the reference signal RAMP intersect with each other and the output of the comparator 151-1 is inverted, the counter latch 151-2 performs the count.

The counter latch 151-2 performs the count operation in synchronization with, for example, the clock CLK, stops the count operation when the output level of the comparator 151-1 is inverted, and retains a value at the time.

The P phase of the reset levels includes variations between pixels.

In the second conversion, signals, which are photoelectrically converted by respective unit pixels 110A, are read to the vertical signal lines 116 (116-1 to 116-n) (D phase), and AD conversion is performed.

At the D-phase time, also the DAC 161 adds up the output signal S163 of the clamp DAC 163 for DC level control and the output signal S162 of the ramp DAC 162 subjected to the offset adjustment, and generates the reference signal RAMP (Vslop).

In each column processing circuit (ADC) 151, the comparator 151-1, which is disposed for each column, compares the analog signal potential Vsl, which is read to the vertical signal line 116, with the reference signal RAMP.

Until levels of the analog potential Vsl and the reference signal RAMP intersect each other and the output of the comparator 151-1 is inverted, the counter latch 151-2 performs the count.

The counter latch 151-2 performs the count operation in synchronization with, for example, the clock CLK, stops the count operation when the output level of the comparator 151-1 is inverted, and retains a value at the time.

In addition to the results of the P-phase and D-phase conversion, the calculation of (D-phase level–P-phase level) is executed, thereby realizing correlated double sampling (CDS).

Signals converted into digital signals are sequentially read to the amplifier circuits 170 through the horizontal transfer line LTRF by the horizontal (column) transfer scanning circuit 130, and finally output.

In such a manner, the column-parallel output processing is performed.

The above description was given of the exemplary case of performing the offset adjustment of the clamp DAC output in the P phase and D phase.

Specifically, in the first method according to the embodiment shown in FIG. 9, the control based on pseudo-random numbers is performed at the P-phase time (the primary sampling), at the D-phase time (the secondary sampling), or at the P-phase time and D-phase time (both samplings). In other words, in the first method, by changing the true value, the way of rounding (quantization) in the AD conversion is changed.

In the embodiment, in the second method, the control can be performed as follows: the offset signal is not applied at the time of P phase (the primary sampling) and D phase (the secondary sampling) but only applied at the time of auto zero (AZ) so as not to change the true value.

Figure 10:
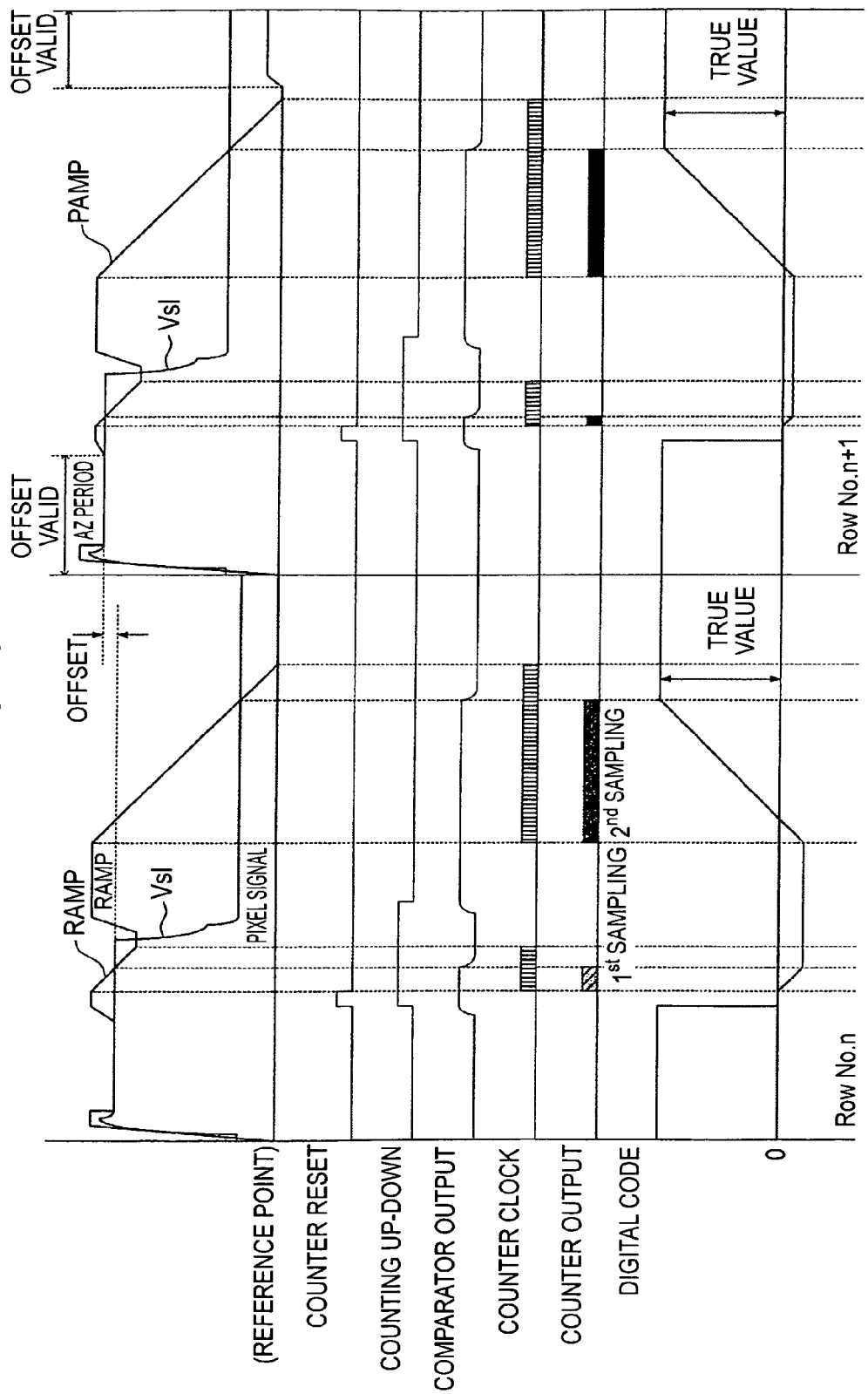
FIG. 10 is a diagram illustrating an operation waveform in a case where the offset adjustment is not performed during either period of the P-phase time and the D-phase time and the offset adjustment is performed during an auto zero period.

FIG. 10 is a diagram illustrating an operation waveform in a case where the offset adjustment is not performed during any period of the P-phase time and the D-phase time and the offset adjustment is performed during an auto zero period.

As shown in FIG. 10, the offset adjustment period is limited to only the auto zero period (the AZ period).

In this case, similarly to the first method of FIG. 8, the quantization vertical streaks caused by the quantization error become inconspicuous.

Further, the control, which is performed not to apply the offset signal at the time of the P phase (the primary sampling) and D phase (the secondary sampling) but to apply the signal only at the time of auto zero (AZ), is equivalent to a way of making the offset values of the P-phase time and the D-phase time equal to each other.

FIG. 11 shows diagrams illustrating specific examples of the DAC control based on pseudo-random numbers, which make the offset values of the P-phase time and the D-phase time equal to each other, according to the embodiment.

Part (A) in FIG. 11 shows the case where the offset adjustment is not applied. Part (B) in FIG. 11 shows the case where the offset adjustment is applied.

In FIG. 11, part (X) indicates analog values before the AD conversion, part (Y) indicates digital values after the AD conversion, and part (Z) indicates values after the CDS.

In this example, in a P phase in the case where the offset adjustment is not applied, a digitally-converted analog value in "a" row and "A" column is "0.9", a digitally-converted analog value in "b" row and "A" column is "0.7", and a digitally-converted analog value in "c" row and "A" column is "0.9".

A digitally-converted analog value in "a" row and "B" column is "0.4", a digitally-converted analog value in "b" row and "B" column is "0.5", and a digitally-converted analog value in "c" row and "B" column is "0.3".

A digitally-converted analog value in "a" row and "C" column is "1.6", a digitally-converted analog value in "b" row and "C" column is "1.5", and a digitally-converted analog value in "c" row and "C" column" is "1.4".

For example, as shown in FIG. 11, offset values are set such that set values in the "a", "b", and "c" rows are set to be equivalent to +0.2 LSB (the control is originally analog control but, for easier understanding, the value is digitally converted).

As a result, in the P phase, the digitally-converted analog value in "a" row and "A" column changes from "0.9" to "1.1", the digitally-converted analog value in "b" row and "A" column changes from "0.7" to "0.9", and the digitally-converted analog value in "c" row and "A" column changes from "0.9" to "1.1".

The digitally-converted analog value in "a" row and "B" column changes from "0.4" to "0.6", the digitally-converted analog value in "b" row and "B" column changes from "0.5" to "0.7", and the digitally-converted analog value in "c" row and "B" column changes from "0.3" to "0.5".

The digitally-converted analog value in "a" row and "C" column changes from "1.6" to "1.8", the digitally-converted analog value in "b" row and "C" column changes from "1.5" to "1.7", and the digitally-converted analog value in "c" row and "C" column changes from "1.4" to "1.6".

In a D phase in the case without the offset adjustment, a digitally-converted analog value in "a" row and "A" column is "1.2", a digitally-converted analog value in "b" row and "A" column is "1.1", and a digitally-converted analog value in "c" row and "A" column is "1.3".

A digitally-converted analog value in "a" row and "B" column is "0.8", a digitally-converted analog value in "b" row and "B" column is "0.8", and a digitally-converted analog value in "c" row and "B" column is "0.6".

A digitally-converted analog value in "a" row and "C" column is "1.9", a digitally-converted analog value in "b" row and "C" column is "1.6", and a digitally-converted analog value in "c" row and "C" column is "1.7".

For example, as shown in FIG. 11, offset values are set, similarly to the P-phase time, such that set values in the "a", "b", and "c" rows are set to be equivalent to +0.2 LSB (the control is originally analog control but, for easier understanding, the value is digitally converted).

As a result, in the D phase, the digitally-converted analog value in "a" row and "A" column changes from "1.2" to "1.4", the digitally-converted analog value in "b" row and "A" column changes from "1.1" to "1.3", and the digitally-converted analog value in "c" row and "A" column changes from "1.3" to "1.5".

The digitally-converted analog value in "a" row and "B" column changes from "0.8" to "1.0", the digitally-converted analog value in "b" row and "B" column changes from "0.8" to "1.0", and the digitally-converted analog value in "c" row and "B" column changes from "0.6" to "0.8".

The digitally-converted analog value in "a" row and "C" column changes from "1.9" to "2.1", the digitally-converted analog value in "b" row and "C" column changes from "1.6" to "1.8", and the digitally-converted analog value in "c" row and "C" column changes from "1.7" to "1.9".

In the case where the offset adjustment is not applied, digital values after the AD conversion are as described below.

In the P phase, the digitally-converted analog value "0.9" in "a" row and "A" column changes to a digital value "0", the digitally-converted analog value "0.7" in "b" row and "A" column changes to a digital value "0", and the digitally-converted analog value "0.9" in "c" row and "A" column changes to a digital value "0".

The digitally-converted analog value "0.4" in "a" row and "B" column changes to a digital value "0", the digitally-converted analog value "0.5" in "b" row and "B" column changes to a digital value "0", and the digitally-converted analog value "0.3" in "c" row and "B" column changes to a digital value "0".

The digitally-converted analog value "1.6" in "a" row and "C" column changes to a digital value "1", the digitally-converted analog value "1.5" in "b" row and "C" column changes to a digital value "1", and the digitally-converted analog value "1.4" in "c" row and "C" column changes to a digital value "1".

In the D phase, the digitally-converted analog value "1.2" in "a" row and "A" column changes to a digital value "1", the digitally-converted analog value "1.1" in "b" row and "A"

column changes to a digital value and the digitally-converted analog value "1.3" in "c" row and "A" column changes to a digital value "1".

The digitally-converted analog value "0.8" in "a" row and "B" column changes to a digital value "0", the digitally-converted analog value "0.8" in "b" row and "B" column changes to a digital value "0", and the digitally-converted analog value "0.6" in "c" row and "B" column changes to a digital value "0".

The digitally-converted analog value "1.9" in "a" row and "C" column changes to a digital value "1", the digitally-converted analog value "1.6" in "b" row and "C" column changes to "1", and the digitally-converted analog value "1.7" in "c" row and "C" column changes to a digital value "1".

In addition, digital values after the CDS are as described below.

The digital value in "a" row and "A" column changes to "1", the digital value in "b" row and "A" column changes to "1", and the digital value in "c" row and "A" column changes to "1".

The digital value in "a" row and "B" column changes to "0", the digital value in "b" row and "B" column changes to "0", and the digital value in "c" row and "B" column changes to "0".

The digital value in "a" row and "C" column changes to "0", the digital value in "b" row and "C" column changes to "0", and the digital value in "c" row and "C" column changes to "0".

In this case, in the "A" column, since correlation among the rows is high, it is likely that the quantization error appears as fixed vertical streaks.

In the case where the offset adjustment is applied, digital values after the AD conversion are as described below.

In the P phase, a digitally-converted analog value "1.1" in "a" row and "A" column changes to a digital value "1", a digitally-converted analog value "0.9" in "b" row and "A" column changes to a digital value "0", and a digitally-converted analog value "1.1" in "c" row and "A" column changes to a digital value "1".

A digitally-converted analog value "0.6" in "a" row and column changes to a digital value a digitally-converted analog value "0.7" in "b" row and "B" column changes to a digital value and a digitally-converted analog value "0.5" in "c" row and "B" column changes to a digital value "0".

A digitally-converted analog value "1.8" in "a" row and "C" column changes to a digital value "1", a digitally-converted analog value "1.7" in "b" row and "C" column changes to a digital value "1", and a digitally-converted analog value "1.6" in "c" row and "C" column changes to a digital value "1".

In the D phase, a digitally-converted analog value "1.4" in "a" row and "A" column changes to a digital value "1", a digitally-converted analog value "1.4" in "b" row and "A" column changes to a digital value "1", and a digitally-converted analog value "1.5" in "c" row and "A" column changes to a digital value "1".

A digitally-converted analog value "1.0" in "a" row and "B" column changes to a digital value a "1" digitally-converted analog value "1.0" in "b" row and "B" column changes to a digital value and a digitally-converted analog value "0.8" in "c" row and "B" column changes to a digital value "0".

A digitally-converted analog value "2.1" in "a" row and "C" column changes to a digital value "2", a digitally-converted analog value "1.8" in "b" row and "C" column changes to a digital value "1", and a digitally-converted analog value "1.9" in row and "C" column changes to a digital value "1".

In addition, digital values after the CDS are as described below.

The digital value in "a" row and "A" column changes to "0", the digital value in "b" row and "A" column changes to "1", and the digital value in "c" row and "A" column changes to "0".

The digital value in "a" row and "B" column changes to "1", and the digital value in "b" row and "B" column changes to "1", and the digital value in "c" row and "B" column changes to "0".

The digital value in "a" row and "C" column changes to "1", the digital value in "b" row and "C" column changes to "0", and the digital value in "c" row and "C" column changes to "0".

In this case, in the respective columns, correlation among the rows is not high, and thus, although this method is slightly less effective than the first method, there is no concern about occurrence of the fixed vertical streaks.

As described above, according to the solid-state imaging device of the embodiment, it is possible to obtain the following effects.

According to the embodiment, through only the adjustment of the offset values, it is possible to control the sampling values with high accuracy.

The adjustment is performed for each row, thereby realizing the dither processing in an analog format. Occurrence of quantization vertical streaks can be suppressed, whereby it is possible to prevent subjective image quality from deteriorating.

These functions can be realized by only adding new control functions to the existing circuit. The size of the circuit does not increase.

The solid-state imaging device having such effects can be applied as an imaging device of a digital camera or a video camera.

<4. Exemplary Configuration of Camera System>

Figure 12:
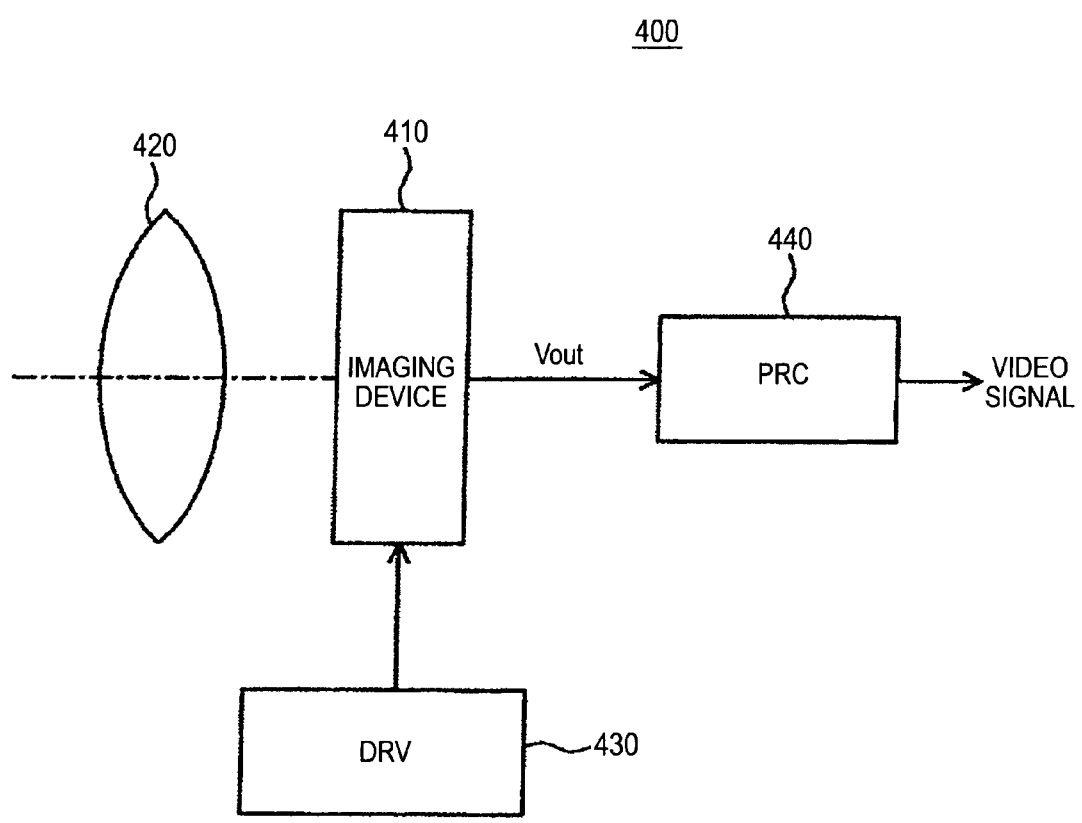
FIG. 12 is a diagram illustrating an exemplary configuration of a camera system using the solid-state imaging device according to the embodiments of the present disclosure.

FIG. 12 is a diagram illustrating an exemplary configuration of a camera system using the solid-state imaging device according to the embodiments of the present disclosure.

A camera system 400 includes, as shown in FIG. 12, an imaging device 410 to which the solid-state imaging device 100 according to the embodiment can be applied.

The camera system 400 further includes an optical system that guides incident light (which forms a subject image on) to the pixel area of the imaging device 410, for example, a lens 420 that forms an image of the incident light (image light) on the imaging surface.

The camera system 400 further includes a driving circuit (DRV) 430 that drives the imaging device 410 and a signal processing circuit (PRC) 440 that processes an output signal of the imaging device 410.

The driving circuit 430 includes a timing generator (not shown) that produces various timing signals including a start pulse and clock pulses for driving the circuits in the imaging device 410. The driving circuit 430 drives the imaging device 410 by using predetermined timing signals.

Further, the signal processing circuit 440 performs predetermined signal processing on the output signal of the imaging device 410.

The image signal, which is processed by the signal processing circuit 440, is recorded in a recording medium such as a memory. The image information recorded on the recording medium is formed as a hard copy by using a printer or the like. Further, the image signal, which is processed by the signal processing circuit 440, is also displayed as video images on a monitor formed of a liquid crystal display or the like.

As described above, in an image capturing apparatus such as a digital still camera, by incorporating the above-mentioned solid-state imaging device 100 as the imaging device 410, it is possible to achieve a high-precision camera system.

The present disclosure contains subject matter related to those disclosed in Japanese Priority Patent Applications JP 2009-174367 and JP 2010-167543 filed in the Japan Patent Office on Jul. 27, 2009 and Jul. 26, 2010, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel section in which a plurality of pixels performing photoelectric conversion are arranged in a matrix shape; and
a pixel signal reading section that has an AD conversion section which reads pixel signals through a plurality of pixel units from the pixel section and performs analog digital (AD) conversion,
wherein the pixel signal reading section includes
a plurality of comparators each of which compares a reference signal, which is a ramp wave, with read analog signal potentials of pixels in a corresponding column,
a plurality of counter latches, each of which is disposed to correspond to each one of the plurality of comparators, is configured to count a comparison time of the corresponding comparator, stops the count when an output of the corresponding comparator is inverted, and retains a corresponding count value, and
an adjustment section that performs offset adjustment on the reference signal for each row on which the AD conversion is performed, wherein the adjustment section performs clamp processing on the reference signal on the basis of a set value which is set in response to a control signal, and
wherein the set value is set such that an amount of change in an output value of each counter latch is within ±0.5 LSB.

2. A solid-state imaging device comprising:
a pixel section in which a plurality of pixels performing photoelectric conversion are arranged in a matrix shape; and
a pixel signal reading section that has an AD conversion section which reads pixel signals through a plurality of pixel units from the pixel section and performs analog digital (AD) conversion,
wherein the pixel signal reading section includes
a plurality of comparators each of which compares a reference signal, which is a ramp wave, with read analog signal potentials of pixels in a corresponding column,
a plurality of counter latches, each of which is disposed to correspond to each one of the plurality of comparators, is configured to count a comparison time of the corresponding comparator, stops the count when an output of the corresponding comparator is inverted, and retains a corresponding count value, and
an adjustment section that performs offset adjustment on the reference signal for each row on which the AD conversion is performed, and wherein the adjustment section performs the offset adjustment on the reference signal for a dark time for which a luminance level of the signal is lower than a preset level.

3. The solid-state imaging device according to claim 2, further comprising a determination section that receives an output signal of the pixel signal reading section and determines whether or not the luminance level of the corresponding signal is lower than the preset level,
wherein the adjustment section performs the offset adjustment on the reference signal when the determination section determines that the luminance level of the signal is lower than the preset level.

4. The solid-state imaging device according to claim 1, wherein
wherein the pixel signal reading section is configured to perform correlated double sampling processing by performing primary sampling and secondary sampling relating to the count operations which are performed by the counter latches, and
wherein the adjustment section is configured to perform the offset adjustment on the reference signal relating to at least one sampling out of the primary sampling and the secondary sampling.

5. The solid-state imaging device according to claim 4, wherein the adjustment section applies different offset values to the offset adjustment of the reference signals relating to the primary sampling and the secondary sampling, and performs the offset adjustment.

6. The solid-state imaging device according to claim 4, wherein the adjustment section applies the same offset values to the offset adjustment of the reference signals relating to the primary sampling and the secondary sampling, and performs the offset adjustment.

7. The solid-state imaging device according to claim 4, wherein the pixel signal reading section is configured to perform initialization processing, which determines an operating point for each column, on input portions of the comparators at the time of starting a row operation, and
wherein the adjustment section does not perform the offset adjustment at the time of the primary sampling and the secondary sampling, and performs the offset adjustment during an initialization processing period.

8. The solid-state imaging device according to claim 1, wherein the set value can be set for each read row.

9. A camera system comprising:
the solid-state imaging device according to claim 1, and
an optical system that forms a subject image on the solid-state imaging device.

10. The solid-state imaging device according to claim 2, wherein
wherein the pixel signal reading section is configured to perform correlated double sampling processing by performing primary sampling and secondary sampling relating to the count operations which are performed by the counter latches, and
wherein the adjustment section is configured to perform the offset adjustment on the reference signal relating to at least one sampling out of the primary sampling and the secondary sampling.

11. The solid-state imaging device according to claim 10, wherein the adjustment section applies different offset values to the offset adjustment of the reference signals relating to the primary sampling and the secondary sampling, and performs the offset adjustment.

12. The solid-state imaging device according to claim 10, wherein the adjustment section applies the same offset values to the offset adjustment of the reference signals relating to the primary sampling and the secondary sampling, and performs the offset adjustment.

13. The solid-state imaging device according to claim 10, wherein the pixel signal reading section is configured to perform initialization processing, which determines an operating point for each column, on input portions of the comparators at the time of starting a row operation, and wherein the adjustment section does not perform the offset adjustment at the time of the primary sampling and the secondary sampling, and performs the offset adjustment during an initialization processing period.

14. The solid-state imaging device according to claim 2, wherein the set value can be set for each read row.

15. A camera system comprising:
the solid-state imaging device according to claim 2, and
an optical system that forms a subject image on the solid-state imaging device.

16. A solid-state imaging device comprising:
a pixel section in which a plurality of pixels performing photoelectric conversion are arranged in a matrix shape; and
a pixel signal reading section that has an AD conversion section which reads pixel signals through a plurality of pixel units from the pixel section and performs analog digital (AD) conversion,
wherein the pixel signal reading section includes
  a plurality of comparators each of which compares a reference signal, which is a ramp wave, with read analog signal potentials of pixels in a corresponding column,
  a plurality of counter latches, each of which is disposed to correspond to each one of the plurality of comparators, is configured to count a comparison time of the corresponding comparator, stops the count when an output of the corresponding comparator is inverted, and retains a corresponding count value, and
  an adjustment section that performs offset adjustment on the reference signal for each row on which the AD conversion is performed,
wherein the pixel signal reading section is configured to perform correlated double sampling processing by performing primary sampling and secondary sampling relating to the count operations which are performed by the counter latches, wherein in the primary sampling, reset levels of the pixel units are read to signal lines, and in the secondary sampling, photoelectric conversion signals produced by the unit pixels are read to the signal lines, and wherein the adjustment section is configured to perform the offset adjustment on the reference signal relating to at least one sampling out of the primary sampling and the secondary sampling.

17. The solid-state imaging device according to claim 16, wherein the adjustment section performs clamp processing on the reference signal on the basis of a set value which is set in response to a control signal, and
wherein the set value is set such that an amount of change in an output value of each counter latch is within ±0.5 LSB.

18. The solid-state imaging device according to claim 16, wherein
the offset adjustment is performed to correct effects of reset characteristics of the pixel signal reading section.

19. The solid-state imaging device according to claim 16, wherein the adjustment section applies different offset values to the offset adjustment of the reference signals relating to the primary sampling and the secondary sampling, and performs the offset adjustment.

20. The solid-state imaging device according to claim 16, wherein the adjustment section applies the same offset values to the offset adjustment of the reference signals relating to the primary sampling and the secondary sampling, and performs the offset adjustment.

21. The solid-state imaging device according to claim 16, wherein the pixel signal reading section is configured to perform initialization processing, which determines an operating point for each column, on input portions of the comparators at the time of starting a row operation, and
wherein the adjustment section does not perform the offset adjustment at the time of the primary sampling and the secondary sampling, and performs the offset adjustment during an initialization processing period.

22. The solid-state imaging device according to claim 16, wherein the set value can be set for each read row.

23. A camera system comprising:
the solid-state imaging device according to claim 16, and
an optical system that forms a subject image on the solid-state imaging device.

* * * * *